US011138194B2

(12) United States Patent
Yan et al.

(10) Patent No.: US 11,138,194 B2
(45) Date of Patent: Oct. 5, 2021

(54) METHOD OF EXTRACTING RELATIONSHIPS FROM A NOSQL DATABASE

(71) Applicant: International Business Machines Corporation, Armonk, NY (US)

(72) Inventors: Wei Yan, Ningbo (CN); Yan Hu, Ningbo (CN); Qi Ruan, Ningbo (CN); Jian Yu Wang, Ningbo (CN)

(73) Assignee: International Business Machines Corporation, Armonk, NY (US)

( * ) Notice: Subject to any disclaimer, the term of this patent is extended or adjusted under 35 U.S.C. 154(b) by 178 days.

(21) Appl. No.: 16/372,673

(22) Filed: Apr. 2, 2019

(65) Prior Publication Data

US 2020/0320075 A1   Oct. 8, 2020

(51) Int. Cl.
| G06F 7/00 | (2006.01) |
| G06F 17/30 | (2006.01) |
| G06F 16/2453 | (2019.01) |
| G06F 16/2455 | (2019.01) |
| G06F 16/25 | (2019.01) |
| G06F 16/242 | (2019.01) |

(52) U.S. Cl.
CPC ...... *G06F 16/24545* (2019.01); *G06F 16/244* (2019.01); *G06F 16/24549* (2019.01); *G06F 16/24552* (2019.01); *G06F 16/252* (2019.01)

(58) Field of Classification Search
CPC ......... G06F 16/24545; G06F 16/24552; G06F 16/24549; G06F 16/244; G06F 16/252
USPC ...................................................... 707/718
See application file for complete search history.

(56) References Cited

U.S. PATENT DOCUMENTS

| 7,249,135 B2 | 7/2007 | Ma |
| 10,496,640 B2 * | 12/2019 | Taylor ............... G06F 16/24534 |
| 2011/0258178 A1 | 10/2011 | Eidson |

(Continued)

FOREIGN PATENT DOCUMENTS

| CA | 2602642 A1 | 3/2006 |
| CN | 102982130 A | 3/2013 |
| CN | 10409873 A | 1/2014 |

OTHER PUBLICATIONS

Cure, et al., "Ontology Based Data Integration Over Document and Column Family Oriented NOSQL stores", arXiv:1307.2603v1 [cs.DB] Jul. 9, 2013, 16 pages, <https://arxiv.org/abs/1307.2603>.

*Primary Examiner* — Binh V Ho
(74) *Attorney, Agent, or Firm* — Marcus Walker (57) ABSTRACT

Aspects of the present invention disclose a method for identifying a relationship between objects of a NoSQL database based on queries of an application programming interface (API) call. The method includes one or more processors identifying an API call that includes two or more NoSQL query requests. The method further includes determining a class for the two or more NoSQL query requests of the API call. The method further includes determining whether a query value of the first NoSQL query request of the API call is present in a second NoSQL query request. The method further includes determining a relationship between the first NoSQL query request and the second NoSQL query request of the API call. The method further includes creating a view in a relational model database based on the respective determined classes for the two or more NoSQL query requests of the API call and the determined relationship.

20 Claims, 3 Drawing Sheets

(56) References Cited

U.S. PATENT DOCUMENTS

| | | | |
|---|---|---|---|
| 2014/0149400 A1* | 5/2014 | Fu | G06F 16/24564 707/723 |
| 2015/0134754 A1* | 5/2015 | Lauer | H04B 7/18506 709/206 |
| 2015/0317335 A1* | 11/2015 | Jiao | G06F 16/273 707/803 |
| 2017/0124217 A1 | 5/2017 | Hassanzadeh | |
| 2020/0073989 A1* | 3/2020 | Valentin | G06F 16/248 |
| 2020/0142953 A1* | 5/2020 | Chauhan | G06F 40/137 |

* cited by examiner

METHOD OF EXTRACTING RELATIONSHIPS FROM A NOSQL DATABASE

BACKGROUND OF THE INVENTION

The present invention relates generally to the field of databases, and more particularly to extracting relationships from a NoSQL database.

In recent years, with the increase in popularity of websites that emphasize user-generated content, ease of use, participatory culture, and interoperability for end users, demand for more flexible databases arose. The NoSQL database is an approach that works toward managing data as well as database design which comes in handy for big data and real-time web applications. NoSQL systems are also sometimes called "Not only SQL" (Structured Query Language) to emphasize that they may support SQL-like query languages or sit alongside SQL databases in a polyglot persistence architecture.

An Application Programming Interface (API) is a language and message format used by an application program to communicate with an operating system or some other control program, such as a database management system (DBMS) or a communications protocol. In other words, an API is a messenger that delivers a request to a provider that receives the request and returns a response that includes the requested information. Response time is the amount of time a system takes to react to a request once it has received one. For example, the time between the instant we execute an API and this API returns the result of its computation, is the response time.

SUMMARY

Aspects of the present invention disclose a method, computer program product, and system for identifying a relationship between objects of a NoSQL database based on queries of an application programming interface (API) call. The method includes identifying, by one or more processors, an application programming interface (API) call that includes two or more NoSQL query requests. The method further includes determining, by one or more processors, a respective class for the two or more NoSQL query requests of the API call. The method further includes determining, by one or more processors, whether a query value of the first NoSQL query request of the API call is present in a second NoSQL query request of the API call. The method further includes responsive to determining that the query value of the first NoSQL query request of the API call is present in the second NoSQL query request of the API call, determining, by one or more processors, a relationship between the first NoSQL query request and the second NoSQL query request of the API call. The method further includes creating, by one or more processors, a view in a relational model database based on the respective determined classes for the two or more NoSQL query requests of the API call and the determined relationship between the first NoSQL query request and the second NoSQL query request of the API call.

DETAILED DESCRIPTION

Embodiments of the present invention allow for identifying a relationship between objects of a NoSQL database based on queries of an application programming interface (API) call. Embodiments of the present invention create a view of an API call in a relational model database using an identified relationship. Embodiments of the present invention transform two or more NoSQL queries into a NoSQL-SQL query based on the identified relationship.

Some embodiments of the present invention recognize that challenges exist in the process of joining objects of a NoSQL database using queries. Thus, a user has to fetch data records one by one when querying relational data records, which reduces API performance. Various embodiments of the present invention solve the JOIN operating issue of a NoSQL database by identifying a relationship among different objects in a NoSQL database using metadata and data similarity of query expressions of an API call. Additionally, embodiments of the present invention improve API performance by reducing the number of serial calls the API has to execute and generating a report that corresponds to the API call that provides guidance on how to optimize the data model.

Embodiments of the present invention can provide an improvement of reducing the amount of processing resources a server utilizes by querying on a relational database using a data model based on identified relationships to reduce the amount of queries the server has to execute. Embodiments of the present invention ca also provide an improvement of reducing the amount of memory resources a server utilizes by only storing data of an identified relationship in a relational database, thus eliminating the need for a data importer.

Implementation of embodiments of the invention may take a variety of forms, and exemplary implementation details are discussed subsequently with reference to the Figures.

Figure 1:
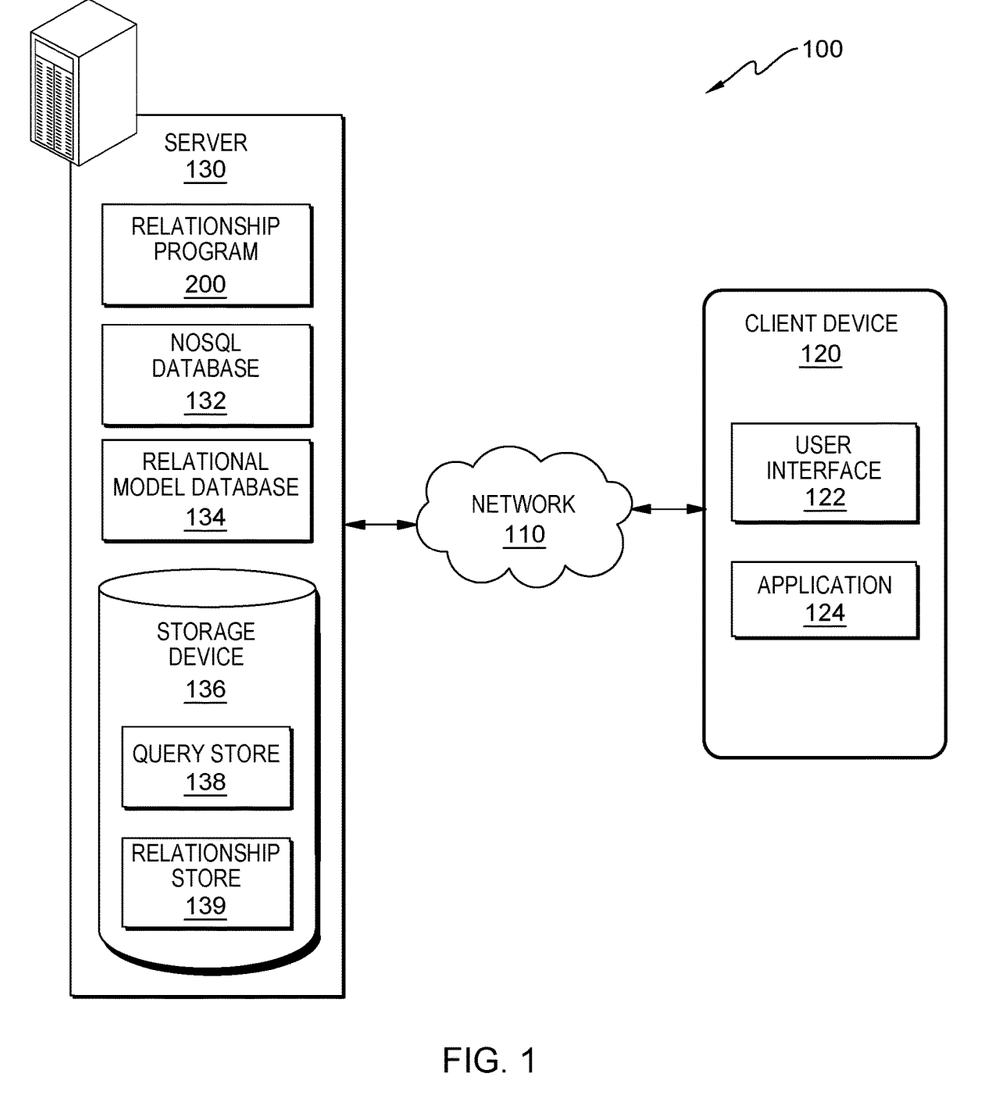
FIG. 1 is a functional block diagram of a data processing environment, in accordance with an embodiment of the present invention.

The present invention will now be described in detail with reference to the Figures. FIG. 1 is a functional block diagram illustrating a distributed data processing environment, generally designated 100, in accordance with one embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

An embodiment of data processing environment 100 includes client device 120, and server 130, all interconnected over network 110. In one embodiment, client device 120, and server 130 communicate through network 110. Network 110 can be, for example, a local area network (LAN), a telecommunications network, a wide area network (WAN), such as the Internet, or any combination of the three, and include wired, wireless, or fiber optic connections. In general, network 110 can be any combination of connections and protocols, which will support communications between client device 120, and server 130, in accordance with embodiments of the present invention. For example, a user uses a computer to send a query to a database of a server, which returns a view in response to the query, over the Internet.

In various embodiments of the present invention, client device 120 may be a workstation, personal computer, digital video recorder (DVR), media player, personal digital assistant, mobile phone, or any other device capable of executing computer readable program instructions, in accordance with embodiments of the present invention. In general, client device 120 is representative of any electronic device or combination of electronic devices capable of executing computer readable program instructions. Client device 120 may include components as depicted and described in further detail with respect to FIG. 3, in accordance with embodiments of the present invention.

Client device 120 includes user interface 122 and application 124. User interface 122 is a program that provides an interface between a user of client device 120 and a plurality of applications that reside on the client device. A user interface, such as user interface 122, refers to the information (such as graphic, text, and sound) that a program presents to a user, and the control sequences the user employs to control the program. A variety of types of user interfaces exist. In one embodiment, user interface 122 is a graphical user interface. A graphical user interface (GUI) is a type of user interface that allows users to interact with electronic devices, such as a computer keyboard and mouse, through graphical icons and visual indicators, such as secondary notation, as opposed to text-based interfaces, typed command labels, or text navigation. In computing, GUIs were introduced in reaction to the perceived steep learning curve of command-line interfaces which require commands to be typed on the keyboard. The actions in GUIs are often performed through direct manipulation of the graphical elements. In another embodiment, user interface 122 is a script or application programming interface (API). An API is a set of functions and procedures allowing the creation of applications that access the features or data of an operating system, application, or other service.

Application 124 is a computer program designed to run on client device 120. An application frequently serves to provide a user with similar services accessed on personal computers (e.g., web browser, playing music, or other media, etc.). In one embodiment, a user utilizes application 124 of client device 120 to request and receive data of server 130. For example, a user uses a database application (e.g., accountant systems, reservation systems, etc.) to retrieve information from a computerized database. In this example, the user inputs a call into the database application (e.g., application 124) that sends a query corresponding to the call to the computerized database (e.g., stored on server 130), which returns information that corresponds to the query.

In various embodiments of the present invention, server 130 may be a desktop computer, a computer server, or any other computer systems, known in the art. In certain embodiments, server 130 represents computer systems utilizing clustered computers and components (e.g., database server computers, application server computers, etc.), which act as a single pool of seamless resources when accessed by elements of data processing environment 100. In general, server 130 is representative of any electronic device or combination of electronic devices capable of executing computer readable program instructions. Server 130 may include components as depicted and described in further detail with respect to FIG. 3, in accordance with embodiments of the present invention.

Server 130 includes NoSQL database 132, relational model database 134, storage device 136, query store 138, relationship store 139, and relationship program 200. Storage device 136 can be implemented with any type of storage device, for example, persistent storage 305, which is capable of storing data that may be accessed and utilized by client device 120 and server 130, such as a database server, a hard disk drive, or a flash memory. Relational model database 134 is an organized collection of data modeled as one or more tables of columns and rows, with a unique key identifying each row.

NoSQL database 134 is an organized collection of data modeled in a form other than tabular relations that is accessible via network 110. In one embodiment, a user of client device 120 inputs an API call using user interface 122 and application 124 sends a query corresponding to the API call of the user to NoSQL database 132. For example, a user uses a computer (e.g., client device 120) to send request to a database (e.g., NoSQL database 132) for a specific document. In another embodiment, NoSQL database 132 utilizes query languages similar to structured query language (SQL) and/or sit alongside relational model database 134 in a polyglot persistence architecture.

Query store 138 captures and stored a history of queries, plans, and runtime statistics, and retains the data for review. In one embodiment, query store 138 stores a query of the user that is received from a query dispatcher. For example, relationship program 200 utilizes a query dispatcher to capture a query of a user for NoSQL database 132 and sends the query to query store 138. In another embodiment, query store 138 stores performance statistics corresponding to the execution of a query transmitted to server 130. For example, query store 138 stores data that correlates to a query (e.g., plan data, runtime statistics, wait statistics, etc.). In this example, query store 138 logs the stored information with respect to corresponding time frames to develop database usage patterns (e.g., CPU, I/O, memory, etc.) and query plan changes.

Relationship Store 139 is database that includes a table, which contains data that corresponds to a relationship between queries of an API call. In one embodiment, relationship program 200 utilizes data of query store 138 to derive a relationship and transmits data corresponding to the derived relationship to relationship store 139. For example, relationship program 200 identifies a relationship between queries of an API call and stores the identified relationship data in a row of a table that corresponds to the API call. In another embodiment, relationship program 200 extracts data corresponding to a relationship of an API call from relationship store 139. For example, relationship program 200 queries all data corresponding to a relationship of a specific API call stored in a table of relationship store 139.

Relationship program 200 transmits a query of application 124 to query store 138 and NoSQL database 132. Relationship program 200 transmits a response to a query on NoSQL database 132 to query store 138 and application 124 of client device 120. Relationship program 200 analyzes queries of an API call of application 124 and determines a relationship in a returned result set. Additionally, relationship program 200 stores the relationship in relationship store 139. Relationship program 200 extracts relationship data of an API call of application 124 from relationship store 139 corresponding data from NoSQL database 132. Relationship program 200 compares execution data of queries of an API call of application 124 on NoSQL database 132 and execution data of a correlated query of relational model database 134, and relationship program 200 verifies the extracted relationship and performance. Additionally, relationship program 200 adjusts the extracted relationship in query store 138.

Figure 2:
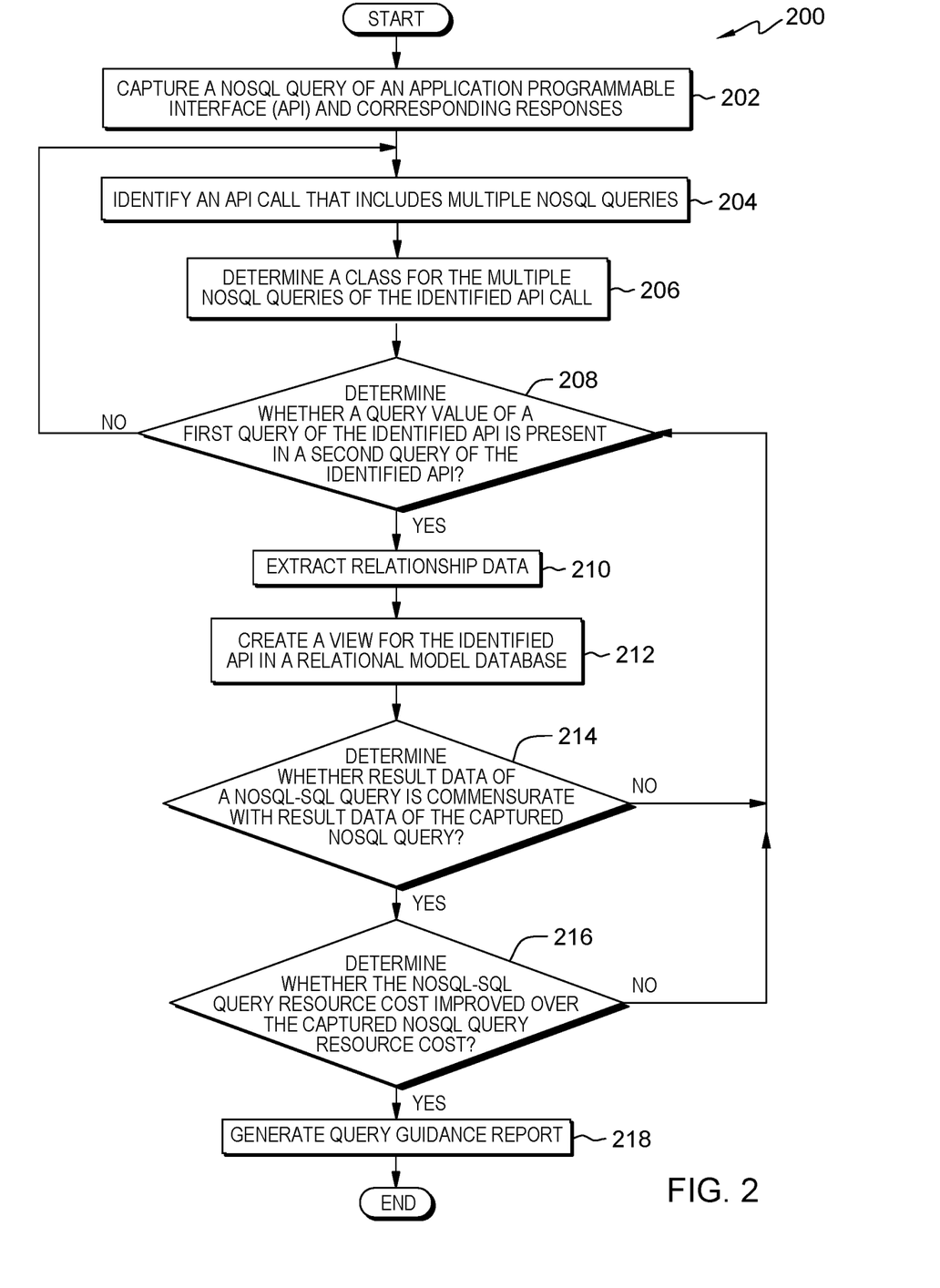
FIG. 2 is a flowchart depicting operational steps of a program for identifying a relationship between objects of a NoSQL database based on queries of an application programming interface (API) call, in accordance with embodiments of the present invention.

FIG. 2 is a flowchart depicting operational steps of relationship program 200, for identifying a relationship between documents of a NoSQL database based on queries of an API call. In one embodiment, relationship program 200 initiates in response to server 130 powering on. In another embodiment, relationship program 200 initiates in response to application 124 sending an API call to server 130. In an additional embodiment, relationship program 200 is a background process running on server 130, which continuously operates while capturing API calls of application 124.

In step 202, relationship program 200 captures a NoSQL query of an API and a corresponding response. In one embodiment, relationship program 200 receives an API call of a user of application 124 and transmits a query of the API call to query store 138 and NoSQL database 132. For example, relationship program 200 utilizes a query dispatcher to capture queries of an API call that a user inputs into a database application (e.g., application 124) of a computer (e.g., client device 120) and sends the captured queries to a NoSQL database and a query store of a server. In another embodiment, relationship program 200 captures responses returned from NoSQL database 132, which corresponds to an API call of application 124, and stores the data in query store 138. For example, relationship program 200 transmits a result set, which corresponds to NoSQL queries of an API call a user input into a computer (e.g., client device 120), and execution data associated with the API call (e.g., CPU usage, plan data, runtime statistics, wait statistics, response time, etc.) to a query store of a server.

In yet another embodiment, relationship program 200 assigns an identifier to each query of an API call relationship program 200 transmits to query store 138. For example, relationship program 200 generates an API call unique identifier (i.e., an alphanumeric code that corresponds to a single API call) for queries of the API call. In this example, relationship program 200 records a timestamp (e.g., when a query is sent, received, processed, etc.) for each query of the API call.

In step 204, relationship program 200 identifies an API call that includes multiple NoSQL queries. In one embodiment, relationship program 200 retrieves data from query store 138. For example, relationship program 200 fetches all API calls a user submits from a query store. In this example, the fetched API calls include the identifier and timestamp assigned when captured by relationship program 200. In another embodiment, relationship program 200 identifies an API call with multiple queries in data retrieved from query store 138. For example, relationship program 200 scans all API calls retrieved from a query store to detect multiple instances of an API call unique identifier with differing timestamps. In another example, relationship program 200 scans all API calls retrieved from a query store to detect multiple instances of an API call unique identifier and compare the query expressions to determine whether the identified API call contains differing query expressions (i.e., contains multiple queries).

In step 206, relationship program 200 determines a class for the multiple NoSQL queries of the identified API call. In one embodiment, relationship program 200 generates a class for each query of an identified API call of query store 138. For example, a query store includes a table where each row includes fields of correlating information (e.g., API call unique identifier, time stamp, query expression, etc.) of an identified API call, which corresponds to a captured NoSQL query of the identified API call (i.e., each row of the table represents a query of the identified API call). In this example, relationship program 200 incrementally generates a class for each query of the identified API call of the table. In another embodiment, relationship program 200 stores class data of an identified API call in query store 138. For example, relationship program 200 inputs the generated class data into an additional field of a record (e.g., row) for a captured NoSQL query of the identified API call and stores the record in a query store. In this example, relationship program 200 also stores the record in a relationship store.

In decision step 208, relationship program 200 determines whether a query value of a first query of the identified API is present in a second query of the identified API. In various embodiments of the present invention, relationship program 200 utilizes probabilistic record linkage (e.g., fuzzy matching) to determine whether a query value (i.e., an element of a query expression that is representative of an entity to be returned from the database) of a first query expression of an identified API call and a second query expression of the identified API call refer to a certain entity or object a database. In one embodiment, relationship program 200 determines whether a query value of a first query expression of an identified API call is present in a second query expression of the identified API call. In another embodiment, relationship program 200 sets a threshold value of a match to a percentage that is less than 100 percent (e.g., less than 1.0) and determines a score of a query value of a first query expression of an identified API call meets or exceeds the threshold value of a match. For example, a query value of a query expression of an API call can be an integer, a string of characters, a numeric value, etc. In another example, relationship program 200 uses preferences of a user to determine a threshold value of a match.

In another embodiment, relationship program 200 utilizes two or more metrics to determine a score of a match of a query value of a first query expression of an identified API call and an element of a second expression of the identified API call. For example, relationship program 200 assigns a score to a metadata (e.g., object type, object name, etc.) and semantic (e.g., numeric value, date value, string value, etc.) similarity of a string of characters (e.g., a query value) of a first query expression of an API call to an element of a second query expression of the API call. In this example, relationship program 200 aggregates the metadata and semantic similarity scores of data and determines whether the aggregated score meets or exceeds a threshold value of a match. In another example, relationship program 200 can vary the weights of metrics used to determine a score of a match.

In another embodiment, if relationship program 200 determines that a query value of a first query expression of an identified API call is not present in a second query expression of the identified API call (decision step 208, "NO" branch), then relationship program 200 returns to step 206 to continue to identify API calls with multiple NoSQL queries. For example, relationship program 200 sets a threshold value of a match at 0.90 out of 1.0 and sets equal weights for both the metadata and data similarity scores. In this example, a query value is representative of a table (e.g., object type) named "FormA" (e.g., string value), relationship program 200 determines that an element of a second query expression of an identified API call represents a key (e.g., object type) and does not match the object type of the query value (e.g., a table). Additionally, relationship program 200 assigns a score of 0.0 to metadata similarity as a result of the element of the second query expression of the identified API call having a different object type from the query value and a score of 0.45 to semantic similarity of the data as a result of the element named "FormI" having a similar character length and value as the query value. Moreover, relationship program 200 combines the assigned scores, determines that the combined score (e.g., 0.45) does not equal or exceed the threshold value of 0.90, and continues to identify API calls with multiple queries in a query store.

In step 210, relationship program 200 extracts relationship data. More specifically, responsive to relationship program 200 determining that a query value of a first query expression of an identified API call is present in a second query expression of the identified API call (decision step 208, "YES" branch), relationship program 200 stores data that correlates to a relationship of a first query expression of the identified API call and the second expression of the identified API call in relationship store 139.

In an example embodiment, relationship program 200 sets a threshold value of a match at 0.90 out of 1.0 and sets equal weights for both the metadata and semantic similarity scores. In this example, a query value is representative of a table (e.g., object type) named "FormA" (e.g., string value), relationship program 200 determines that an element of a second query expression of an identified API call represents a table (e.g., object type) and matches the object type of the query value (e.g., a table). Additionally, relationship program 200 assigns a score of 0.50 to metadata similarity as a result of the element of the second query expression of the identified API call having a similar object type as the query value and a score of 0.45 to semantic similarity as a result of the element of the second query expression of the identified API call named "FormI" having a similar character length and value as the query value. Moreover, relationship program 200 combines the assigned scores, determines that the combined score (e.g., 0.95) exceeds the threshold value of 0.90, and stores data (e.g., query class, key values, involved fields, etc.) that correlates to a relationship of a first query expression of the identified API call and the second expression of the identified API call in a row of a table of relationship store database (e.g., relationship store 139). In this example, relationship program 200 determines that the query value of a first query expression of the API call is possibly a foreign key of the second query expression of the identified API call.

In one embodiment, responsive to relationship program 200 determining that the query value of the first query expression of the identified API call is present in the second query expression of the identified API call (decision step 208, "YES" branch), relationship program 200 extracts relationship data (i.e., the stored data that correlates to the relationship of the first query expression of the identified API call and the second expression of the identified API call) from relationship store 139 and generates a graph. For example, a relationship between a first and second object can be implemented in a relational database (e.g., relational model database 134) as foreign keys in tables. In another example, relationship program 200 retrieves from a table of a relationship database (e.g., relationship store 139), data (e.g., query class, key values, involved fields, etc.) that correlates to a relationship between a first and second object (e.g., a class of a first query expression and a class of a second query expression). In this example, relationship program 200 creates a graph by using a key value (e.g., query value) of the class of the first query expression (e.g., the first object) as a foreign key in the second object.

In step 212, relationship program 200 creates a view for the identified API in a relational model database. In one embodiment, relationship program 200 utilizes a generated graph and extracted relationship data from relationship store 139 that corresponds to an identified API call of NoSQL database 132 and generates a view for the identified API call in relational model database 134. For example, a view is a virtual object (e.g., table) in a relational database that is capable of being queried. In another example, a view can combine data from two or more objects using a JOIN operation.

In another embodiment, relationship program 200 inserts extracted relationship data into an object of relational model database 134. For example, relationship program 200 inserts information (e.g., the generated graph) that represents the relationship between a first class and a second class (e.g., a first object and a second object) and the additional fields that are correlated to the first class and the second class into a relational database. In another embodiment, relationship program 200 utilizes extracted relationship data inserted into an object of relational model database 134 to generate a view of the identified API call. For example, relationship program 200 uses the information that represents the relationship between a first class and a second class to retrieve corresponding (e.g., tables) and joins a first table corresponding to the first class with a second table corresponding the second class, which creates a view displaying all involved fields corresponding to the first class and the second class.

In decision step 214, relationship program 200 determines whether a NoSQL-SQL query result set is equivalent to a NoSQL query result set. In one embodiment, relationship program 200 determines whether a first result set returned in response to querying on relational model database 134 is equivalent to a second result set returned in response to querying on NoSQL database 132. For example, relationship program 200 compares a result set returned in response to NoSQL-SQL queries (i.e., queries on the generated view of a relational database) and a result set returned in response to NoSQL queries on a NoSQL database to determine whether the result set returned in response to NoSQL-SQL queries is comparable to the result set returned in response to NoSQL queries.

In another embodiment, if relationship program 200 determines that a result set returned in response to querying on NoSQL database 132 using a view of relational model database 134 is not equivalent to a result set returned in response to querying on NoSQL database 132 (decision step 214, "NO" branch), then relationship program 200 returns to step 208 to continue to identify a relationship between a first and second query expression of an identified API call. For example, relationship program 200 queries on a NoSQL database using a view of relational database (e.g., relational model database 134), which results in a NoSQL-SQL query mix. Moreover, relationship program 200 compares a collection of rows (e.g., a result set) returned in response to the NoSQL-SQL queries and tables (e.g., a result set) returned in response to the NoSQL queries. In this example, relationship program 200 determines that the collection of rows returned in response to the NoSQL-SQL queries are distinct from the tables returned in response to the NoSQL queries, and continues to identify a relationship between a first query expression and a second query expression of an identified API call.

In decision step 216, relationship program 200 determines whether the NoSQL-SQL query resource cost improved over the captured NoSQL query resource cost. In various embodiments of the present invention, the total query resource cost includes processing resources and execution statistics such as total time cost, which is the sum of the time needed to execute one or more queries, statements, or batches. More specifically, responsive to relationship program 200 determining that a result set returned in response to querying NoSQL database 132 on a view of relational model database 134 is equivalent to a result set returned in response to querying on NoSQL database 132 (decision step 214, "YES" branch), then relationship program 200 determines whether the NoSQL-SQL query resource cost improved over the captured NoSQL query resource cost. For example, relationship program 200 compares a collection of rows (e.g., a first result set) returned in response to a NoSQL-SQL queries on a NoSQL database and tables (e.g., a second result set) returned in response to NoSQL queries on a NoSQL database. In this example, relationship program 200 determines that the collection of rows returned in response to the NoSQL-SQL queries are comparable to the tables returned in response to the NoSQL queries, and determines whether the resource cost of the execution of the NoSQL-SQL queries is improved over the NoSQL queries.

In one embodiment, relationship program 200 utilizes data of query store 138 to determine whether runtime statistics of a NoSQL-SQL query using relational model database 134 are improved over runtime statistics of a NoSQL query on NoSQL database 132. For example, a NoSQL query can include two or more queries which are made on a NoSQL database sequentially. In another example, relationship program 200 retrieves runtime statistics of NoSQL queries on a NoSQL database from a query store and retrieves runtime statistics of NoSQL-SQL queries using a relational database from the query store. In this example, relationship program 200 determines a total time cost for the NoSQL queries and the NoSQL-SQL queries. Moreover, relationship program 200 compares the total time cost of NoSQL queries and NoSQL-SQL queries to determine whether the NoSQL-SQL queries have an improved total time cost with respect to the total time cost of the NoSQL queries.

In another embodiment, if relationship program 200 determines that runtime statistics of a NoSQL-SQL query using relational model database 134 is not improved over runtime statistics of a NoSQL query on NoSQL database 132 (decision step 216, "NO" branch), then relationship program 200 returns to step 208 to continue to identify a relationship between a first and second query expression of an identified API call. For example, relationship program 200 utilizes data of a query store to determine an execution time (i.e., the time taken to return a result set in response to a query) for NoSQL-SQL queries and NoSQL queries. In this example, relationship program 200 compares the execution time of the NoSQL-SQL queries and the execution time of the NoSQL queries and determines that the NoSQL queries require less time to return a result set corresponding to the NoSQL queries than the NoSQL-SQL queries. Moreover, relationship program 200 continues to identify a relationship between a first query expression and a second query expression of an identified API call.

In another embodiment, relationship program 200 compares the processing resources utilized in the execution of NoSQL queries and NoSQL-SQL queries to determine whether the NoSQL-SQL queries have an improved resource cost with respect to the resource cost of the NoSQL queries. For example, relationship program 200 retrieves data of a query store to determine resource allocations (e.g., CPU, 110, memory, etc.) for NoSQL-SQL queries and NoSQL queries. In this example, relationship program 200 compares the resource allocations of the NoSQL-SQL queries and the resource allocations of the NoSQL queries to determine whether allocation of the processing resources of the NoSQL-SQL queries are improved with respect to the allocation of the processing resources of the NoSQL queries. In yet another embodiment, relationship program 200 determines whether the NoSQL-SQL queries have an improved resource cost with respect NoSQL queries based on resource preferences of a user and total time cost. For example, relationship program 200 utilizes a comparison of total time cost and processing resources of NoSQL queries and NoSQL-SQL queries to determine whether the NoSQL-SQL queries have an improved resource cost with respect to the resource cost of the NoSQL queries in accordance with the performance preferences of a user.

In step 218, relationship program 200 generates a query guidance report. More specifically, responsive to relationship program 200 determining that runtime statistics of a NoSQL-SQL query using relational model database 134 is improved over runtime statistics of a NoSQL query on NoSQL database 132 (decision step 216, "YES" branch), then relationship program 200 generates a query guidance report. For example, relationship program 200 determines an execution time for NoSQL-SQL queries and NoSQL queries and compares the execution time of the NoSQL-SQL queries and the execution time of the NoSQL queries. In this example, relationship program 200 determines that the NoSQL queries require more time to return a result set corresponding to the NoSQL queries than the NoSQL-SQL queries and generates a query guidance report that includes instructions to directly query on relational database view first with respect to an identified API call. In another example, relationship program 200 utilizes a query guidance report to optimize the data model of a server to conform with the performance preferences of a user. In this example, the performance preferences of the user can be based on available resources of the server, resource cost, or time cost.

In one embodiment, relationship program 200 generates a report based on data of query store 138 and relationship store 139 to optimize querying in a data model of server 140. For example, relationship program 200 generates a report that can include the extracted relationship for each identified API call, cost improvements, and suggestions on how to optimize a data model. In another example, relationship program 200 generates a report that includes instructions to directly query on a relational database view first with respect to a certain identified API call. In yet another example, relationship program 200 generates a report that includes instructions to query directly on a NoSQL database based on runtime statistics with respect to a certain identified API call.

Figure 3:
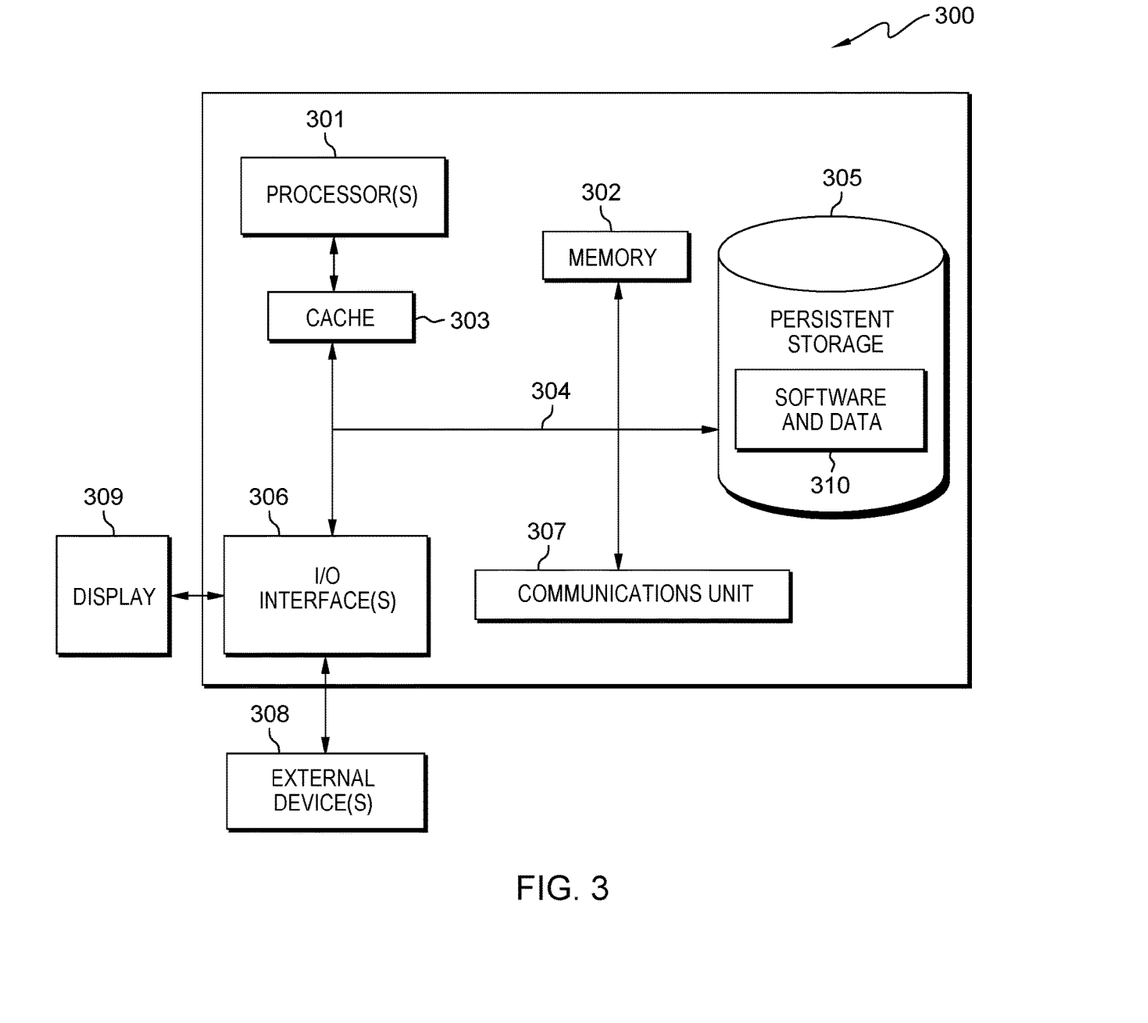
FIG. 3 depicts a block diagram of components of a computing system representative of the server of FIG. 1, in accordance with an embodiment of the present invention.

FIG. 3 depicts computer system 300, which is representative of client device 120 and server 130, in accordance with an illustrative embodiment of the present invention. It should be appreciated that FIG. 3 provides only an illustration of one implementation and does not imply any limitations with regard to the environments in which different embodiments may be implemented. Many modifications to the depicted environment may be made. Computer system 300 includes processor(s) 301, cache 303, memory 302, persistent storage 305, communications unit 307, input/output (I/O) interface(s) 306, and communications fabric 304. Communications fabric 304 provides communications between cache 303, memory 302, persistent storage 305, communications unit 307, and input/output (I/O) interface(s) 306. Communications fabric 304 can be implemented with any architecture designed for passing data and/or control information between processors (such as microprocessors, communications and network processors, etc.), system memory, peripheral devices, and any other hardware components within a system. For example, communications fabric 304 can be implemented with one or more buses or a crossbar switch.

Memory 302 and persistent storage 305 are computer readable storage media. In this embodiment, memory 302 includes random access memory (RAM). In general, memory 302 can include any suitable volatile or non-volatile computer readable storage media. Cache 303 is a fast memory that enhances the performance of processor(s) 301 by holding recently accessed data, and data near recently accessed data, from memory 302.

Program instructions and data (e.g., software and data 310) used to practice embodiments of the present invention may be stored in persistent storage 305 and in memory 302 for execution by one or more of the respective processor(s) 301 via cache 303. In an embodiment, persistent storage 305 includes a magnetic hard disk drive. Alternatively, or in addition to a magnetic hard disk drive, persistent storage 305 can include a solid state hard drive, a semiconductor storage device, a read-only memory (ROM), an erasable programmable read-only memory (EPROM), a flash memory, or any other computer readable storage media that is capable of storing program instructions or digital information.

The media used by persistent storage 305 may also be removable. For example, a removable hard drive may be used for persistent storage 305. Other examples include optical and magnetic disks, thumb drives, and smart cards that are inserted into a drive for transfer onto another computer readable storage medium that is also part of persistent storage 305. Software and data 310 can be stored in persistent storage 305 for access and/or execution by one or more of the respective processor(s) 301 via cache 303. With respect to client device 120, software and data 310 includes data of application 124. With respect to server 130, software and data 310 includes data of query store 138 and relationship store 139.

Communications unit 307, in these examples, provides for communications with other data processing systems or devices. In these examples, communications unit 307 includes one or more network interface cards. Communications unit 307 may provide communications through the use of either or both physical and wireless communications links. Program instructions and data (e.g., software and data 310) used to practice embodiments of the present invention may be downloaded to persistent storage 305 through communications unit 307.

I/O interface(s) 306 allows for input and output of data with other devices that may be connected to each computer system. For example, I/O interface(s) 306 may provide a connection to external device(s) 308, such as a keyboard, a keypad, a touch screen, and/or some other suitable input device. External device(s) 308 can also include portable computer readable storage media, such as, for example, thumb drives, portable optical or magnetic disks, and memory cards. Program instructions and data (e.g., software and data 310) used to practice embodiments of the present invention can be stored on such portable computer readable storage media and can be loaded onto persistent storage 305 via I/O interface(s) 306. I/O interface(s) 306 also connect to display 309.

Display 309 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method comprising:
    identifying, by one or more processors, an application programming interface (API) call that includes two or more NoSQL query requests;
    determining, by one or more processors, a respective class for the two or more NoSQL query requests of the API call;
    determining, by one or more processors, whether a query value of the first NoSQL query request of the API call is present in a second NoSQL query request of the API call;
    in response to determining that the query value of the first NoSQL query request of the API call is present in the second NoSQL query request of the API call, determining, by one or more processors, a relationship between the first NoSQL query request and the second NoSQL query request of the API call; and
    creating, by one or more processors, a view in a relational model database based on the respective determined classes for the two or more NoSQL query requests of the API call and the determined relationship between the first NoSQL query request and the second NoSQL query request of the API call, wherein creating the view in the relational model database, further comprises:
    transforming, by one or more processors, the two or more NoSQL query requests to a NoSQL-SOL query based on the determined relationship.

2. The method of claim 1, wherein creating the view in the relational model database based on the respective determined classes for the two or more NoSQL query requests of the API call and the determined relationship between the first NoSQL query request and the second NoSQL query request of the API call, further comprises:
    extracting, by one or more processors, data that correlates to the determined relationship of the first NoSQL query request of the API call and the second NoSQL query request of the API call, wherein the data is selected from a group consisting of: classes, keys, and additional involved fields of an object;
    inserting, by one or more processors, the extracted data of the first NoSQL query request of the API call and the second NoSQL query request of the API call into a first object and a second object of a relational database; and
    joining, by one or more processors, the first object and the second object of the relational database.

3. The method of claim 1, further comprising:
    capturing, by one or more processors, a NoSQL query request of the API call;
    transmitting, by one or more processors, the NoSQL query request of the API call to a NoSQL database;
    attaching, by one or more processors, an identifier and timestamp to the NoSQL query request of the API call, wherein the identifier is an alphanumeric code; and storing, by one or more processors, the NoSQL query request of the API call with the identifier and timestamp in a query store of a server.

4. The method of claim 1, wherein determining whether a query value of the first NoSQL query request of the API call is present in the second NoSQL query request of the API call, further comprises:
  determining, by one or more processors, a semantic similarity between text of the query value of the first NoSQL query request of the API call and text of the second NoSQL query request of the API call, wherein the semantic similarity is selected from a group consisting of: numeric value, date value, or string value;
  determining, by one or more processors, a metadata similarity between a first object corresponding to the text of the query value of the first NoSQL query request of the API call and metadata of a second object corresponding to the text of the second NoSQL query request of the API call, wherein the metadata similarity is selected from a group consisting of: attribute type or attribute name; and
  determining, by one or more processors, a match between the query value of the first NoSQL query request of the API call and the second NoSQL query request of the API call based on semantic similarity and metadata similarity.

5. The method of claim 1, further comprising:
  comparing, by one or more processors, a first result set returned in response to querying on the created view of the relational database with a second result set returned in response to the two or more NoSQL query requests;
  determining, by one or more processors, that the first result set returned in response to querying on the created view of the relational database is equivalent to the second result set returned in response to the two or more NoSQL query requests;
  determining, by one or more processors, that a resource cost of querying on the created view of the relational database is improved over a resource cost of querying using the two or more NoSQL query requests; and
  generating, by one or more processors, a report of the determined relationship of the API call, wherein data of the report is selected from a group consisting of: NoSQL query requests, NoSQL-SQL query requests, resource cost improvements, and data model optimization suggestions.

6. The method of claim 1, wherein the query value is an element of a query expression of the API call that is representative of an entity returned from the database.

7. The method of claim 1, wherein the class is an incrementally generated alphanumeric code in a field of a row of correlating information of a NoSQL query request of the API call that is exclusive to the NoSQL query request of the API call.

8. A computer program product comprising:
  one or more computer readable storage media and program instructions stored on the one or more computer readable storage media, the program instructions comprising:
  program instructions to identify an application programming interface (API) call that includes two or more NoSQL query requests;
  program instructions to determine a respective class for the two or more NoSQL query requests of the API call;
  program instructions to determine whether a query value of the first NoSQL query request of the API call is present in a second NoSQL query request of the API call;
  in response to determining that the query value of the first NoSQL query request of the API call is present in the second NoSQL query request of the API call, program instructions to determine a relationship between the first NoSQL query request and the second NoSQL query request of the API call; and
  program instructions to create a view in a relational model database based on the respective determined classes for the two or more NoSQL query requests of the API call and the determined relationship between the first NoSQL query request and the second NoSQL query request of the API call, wherein creating the view in the relational model database, further comprises program instructions to:
    transform the two or more NoSQL query requests to a NoSQL-SOL query based on the determined relationship.

9. The computer program product of claim 8, wherein program instructions to create a view in a relational model database based on the respective determined classes for the two or more NoSQL query requests of the API call and the determined relationship between the first NoSQL query request and the second NoSQL query request of the API call, further comprise program instructions to:
  extract data that correlates to the determined relationship of the first NoSQL query request of the API call and the second NoSQL query request of the API call, wherein the data is selected from a group consisting of: classes, keys, and additional involved fields of an object;
  insert the extracted data of the first NoSQL query request of the API call and the second NoSQL query request of the API call into a first object and a second object of a relational database; and
  join the first object and the second object of the relational database.

10. The computer program product of claim 8, further comprising program instructions, stored on the one or more computer readable storage media, to:
  capture a NoSQL query request of the API call;
  transmit the NoSQL query request of the API call to a NoSQL database;
  attach an identifier and timestamp to the NoSQL query request of the API call, wherein the identifier is an alphanumeric code; and
  store the NoSQL query request of the API call with the identifier and timestamp in a query store of a server.

11. The computer program product of claim 8, wherein program instructions to determine whether a query value of the first NoSQL query request of the API call is present in a second NoSQL query request of the API call, further comprise program instructions to:
  determine a semantic similarity between text of the query value of the first NoSQL query request of the API call and text of the second NoSQL query request of the API call, wherein the semantic similarity is selected from a group consisting of: numeric value, date value, or string value;
  determine a metadata similarity between a first object corresponding to the text of the query value of the first NoSQL query request of the API call and metadata of a second object corresponding to the text of the second NoSQL query request of the API call, wherein the metadata similarity is selected from a group consisting of: attribute type or attribute name; and determine a match between the query value of the first NoSQL query request of the API call and the second NoSQL query request of the API call based on semantic similarity and metadata similarity.

12. The computer program product of claim 8, further comprising program instructions, stored on the one or more computer readable storage media, to:

compare a first result set returned in response to querying on the created view of the relational database with a second result set returned in response to the two or more NoSQL query requests;

determine that the first result set returned in response to querying on the created view of the relational database is equivalent to the second result set returned in response to the two or more NoSQL query requests;

determine that a resource cost of querying on the created view of the relational database is improved over a resource cost of querying using the two or more NoSQL query requests; and generate a report of the determined relationship of the API call, wherein data of the report is selected from a group consisting of: NoSQL query requests, NoSQL-SQL query requests, resource cost improvements, and data model optimization suggestions.

13. The computer program product of claim 8, wherein the query value is an element of a query expression of the API call that is representative of an entity returned from the database.

14. The computer program product of claim 8, wherein the class is an incrementally generated alphanumeric code in a field of a row of correlating information of a NoSQL query request of the API call that is exclusive to the NoSQL query request of the API call.

15. A computer system comprising:
one or more computer processors;
one or more computer readable storage media; and
program instructions stored on the computer readable storage media for execution by at least one of the one or more processors, the program instructions comprising:

program instructions to identify an application programming interface (API) call that includes two or more NoSQL query requests;

program instructions to determine a respective class for the two or more NoSQL query requests of the API call;

program instructions to determine whether a query value of the first NoSQL query request of the API call is present in a second NoSQL query request of the API call;

in response to determining that the query value of the first NoSQL query request of the API call is present in the second NoSQL query request of the API call, program instructions to determine a relationship between the first NoSQL query request and the second NoSQL query request of the API call; and program instructions to create a view in a relational model database based on the respective determined classes for the two or more NoSQL query requests of the API call and the determined relationship between the first NoSQL query request and the second NoSQL query request of the API call, wherein creating the view in the relational model database, further comprises program instructions to:

transform the two or more NoSQL query requests to a NoSQL-SOL query based on the determined relationship.

16. The computer system of claim 15, wherein the program instructions to create a view in a relational model database based on the respective determined classes for the two or more NoSQL query requests of the API call and the determined relationship between the first NoSQL query request and the second NoSQL query request of the API call, further comprise program instructions to:

extract data that correlates to the determined relationship of the first NoSQL query request of the API call and the second NoSQL query request of the API call, wherein the data is selected from a group consisting of: classes, keys, and additional involved fields of an object;

insert the extracted data of the first NoSQL query request of the API call and the second NoSQL query request of the API call into a first object and a second object of a relational database; and join the first object and the second object of the relational database.

17. The computer system of claim 15, further comprising program instructions, stored on the computer readable storage media for execution by at least one of the one or more processors, to:

capture a NoSQL query request of the API call;

transmit the NoSQL query request of the API call to a NoSQL database;

attach an identifier and timestamp to the NoSQL query request of the API call, wherein the identifier is an alphanumeric code; and store the NoSQL query request of the API call with the identifier and timestamp in a query store of a server.

18. The computer system of claim 15, wherein the program instructions to determine whether a query value of the first NoSQL query request of the API call is present in a second NoSQL query request of the API call, further comprise program instructions to:

determine a semantic similarity between text of the query value of the first NoSQL query request of the API call and text of the second NoSQL query request of the API call, wherein the semantic similarity is selected from a group consisting of: numeric value, date value, or string value;

determine a metadata similarity between a first object corresponding to the text of the query value of the first NoSQL query request of the API call and metadata of a second object corresponding to the text of the second NoSQL query request of the API call, wherein the metadata similarity is selected from a group consisting of: attribute type or attribute name; and determine a match between the query value of the first NoSQL query request of the API call and the second NoSQL query request of the API call based on semantic similarity and metadata similarity.

19. The computer system of claim 15, further comprising program instructions, stored on the computer readable storage media for execution by at least one of the one or more processors, to:

compare a first result set returned in response to querying on the created view of the relational database with a second result set returned in response to the two or more NoSQL query requests;

determine that the first result set returned in response to querying on the created view of the relational database is equivalent to the second result set returned in response to the two or more NoSQL query requests;

determine that a resource cost of querying on the created view of the relational database is improved over a resource cost of querying using the two or more NoSQL query requests; and generate a report of the determined relationship of the API call, wherein data of the report is selected from a group consisting of: NoSQL query requests, NoSQL-SQL query requests, resource cost improvements, and data model optimization suggestions.

20. The computer system of claim 15, wherein the query value is an element of a query expression of the API call that is representative of an entity returned from the database.

* * * * *